May 11, 1926.

H. P. STEVENS

CHAIN CONTROLLING DEVICE

Original Filed May 20, 1924

1,584,198

Inventor
Harry P. Stevens.

By his Attorneys
Sheffield & Betts.

Patented May 11, 1926.

1,584,198

UNITED STATES PATENT OFFICE.

HARRY P. STEVENS, OF NEW YORK, N. Y.

CHAIN-CONTROLLING DEVICE.

Original application filed May 20, 1924, Serial No. 714,624. Divided and this application filed May 21, 1925. Serial No. 31,891.

This invention relates to improved means for controlling sprocket chains such as those used for raising and lowering and adjusting the position of windows of various enclosures, particularly glass windows for automobile bodies and doors. However, this invention is not limited to this particular use and is applicable to many other uses which will be apparent to those skilled in the art.

The object of this invention is to produce means for guiding and controlling the action of sprocket chains which are used for producing a thrust and pulling actions, according to the direction in which the chain is operated, by means of a suitable driving mechanism such as a sprocket wheel. The arrangement described herein is particularly applicable to the operation of automobile windows above referred to, which apparatus I have described and claimed in my original application for Letters Patent filed May 20, 1924, Serial No. 714,624, of which the present application is a division. The arrangement described in said original application comprises a sprocket wheel adapted to engage a sprocket chain which comprises block links having pivoted thereto side plates or links, the ends of which abut against each other so that the chain is made incapable of being flexed from a straight line in one direction but is free to be flexed in the opposite direction, so that it may pass freely over and around the sprocket wheel. When the links of this chain are in alignment, the same acts as a stiff rod upon which a thrust may be placed in order to force the window downward. It will be apparent that when sprocket chains of this type are subject to a longitudinal thrust, there is a possibility that they will bend or be bowed in the direction in which the flexing is not opposed by the abutting links and, furthermore, since the action of the sprocket wheel is one which tends more or less to cause the links to rise or move radially from the teeth of the sprocket wheel, means are required to prevent these two possible occurrences. The object of the present invention, therefore, is to provide such means in an efficient and simple maner.

For a detailed description of one form of the present invention which I at present deem preferable, reference may be had to the following specification and to the accompanying drawing forming a part thereof, in which—

Figure 1:
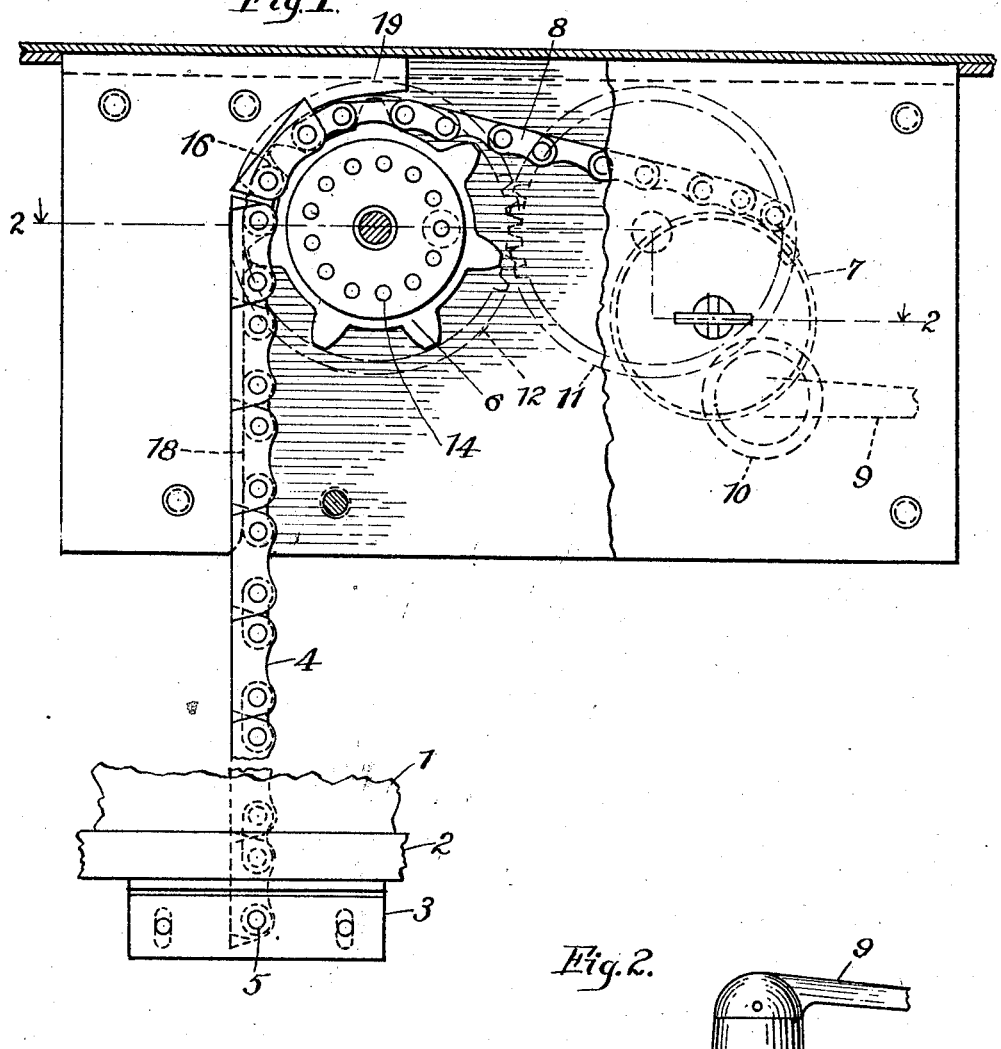
Figure 2:
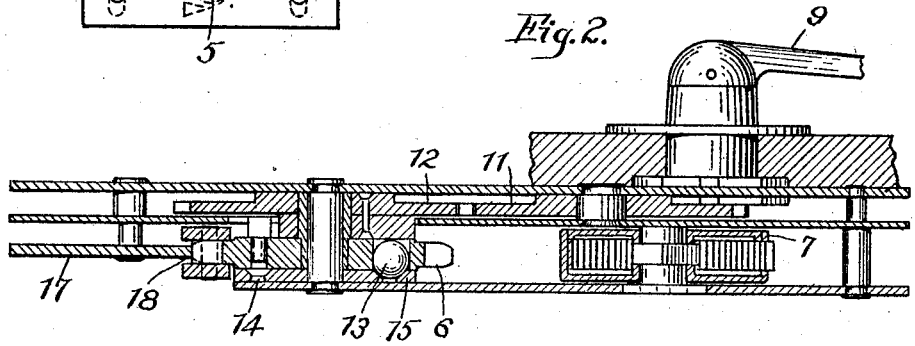

Fig. 1 is a side elevation partially in section showing the main features of the invention; and Fig. 2 is a cross-sectional view of the device shown in Fig. 1 and taken substantially upon the line 2—2 of Fig. 1.

As set forth in my prior application above referred to, this invention will be described in connection with the window raising and lowering device, but I wish it to be understood that this particular device is used for illustrative purposes only, the invention being capable of adaptation to a large variety of other uses.

Referring to the drawings, the numeral 1 indicates a fragmentary portion of a glass window of an automobile door or similar structure, which window is provided with a grooved binding strip 2 which is attached in any suitable way to a bracket 3. The sprocket chain 4 has its lower end attached to said bracket 3 by means of a pin 5 or other suitable device. The sprocket chain 4 passes over and around a sprocket wheel 6 and is attached at its upper end to the spring-controlled counter-balancing drum 7, as indicated in dotted lines in Fig. 1. The upper or terminal portion of the sprocket chain, however, need not necessarily include side links with abutting ends but may be made in the form of ordinary block and plate links, as indicated at 8, the chain being shown in Fig. 1 as being fully extended or unwound from the drum 7. The sprocket wheel 6 may be rotated in any suitable way but I have illustrated the same as being rotated through means of the usual crank handle 9 whose shaft carries the gear 10 which meshes with the gear 11 which in turn meshes with the gear 12.

In the form of the apparatus shown in the drawings, the gear 12 is connected with the sprocket wheel 6 by means of a clutch that will rotate the sprocket wheel 6 when the gear 12 is rotated in either direction, but which when at rest will cause the sprocket wheel 6 to be fixed firmly in position so that a jarring or other movement of the device will not cause the position of the parts to be changed. Such a device is indicated by the ball 13 (Fig. 2) which is carried in a recess in the sprocket wheel 6 and adapted to engage successively a series of depressions 14 in a fixed plate 15. The details of construction and operation of this device are set forth in my prior application and are not necessary to repeat here in connection with the description of the present invention.

The chain 4 is preferably composed of links having side plates with inclined abutting ends as described in my prior application above referred to and claimed in my prior application filed May 20, 1924, Serial No. 714,623. However, the present invention is not limited to this particular form of chain since it is applicable to any similar type of chain where the links are adapted to be flexed in one direction only from a straight line.

Referring to Fig. 1 of the drawing, it will be noted that the block link 16 being in contact with the lower surface of one tooth of the sprocket wheel 6, the thrust produced by the downward movement of said tooth will tend to cause said block link 16 to move toward the left and this action, as well as a similar action upon the other teeth of the sprocket wheel, will tend to cause the sprocket chain to become disengaged from the sprocket wheel. If this tendency be not restrained, the sprocket wheel would be allowed to rotate without carrying the sprocket chain with it. To obviate this possible difficulty I have provided a guide in the form of a plate 17 whose margin projects into the path of the sprocket chain 4 and is adapted to contact with one side of the block links of the chain, as indicated at 18 in Fig. 2. The upper end of this plate 17 is curved around the sprocket wheel 6 in the form of a projection 19 which extends slightly beyond a vertical line drawn from the axis of the sprocket wheel 6. This guide provided by the margin of the plate 17 confines the path of the block links of the chain 4 to one which is straight until the sprocket wheel is reached and then confines the said block links to a path corresponding to the curvature of the sprocket wheel 6. Another function of the guide plate 17 is to prevent the sprocket chain 4 from accidentally bowing toward the left from the position illustrated in Fig. 1, as it will be apparent that the guiding portion 18 of the plate 17 will control the movement of the chain toward the left for its entire length down to the point where it is connected with the bracket 3 by the pin 5. Thus the sprocket chain 4 is caused to act substantially like a rigid rod when the links are in alignment.

I have found that this construction efficiently controls the action of the sprocket chain without producing undue friction at any point and without the liability of the sharp corners of the chain coming in contact with any portion of the guide, which action would tend to injure the guide if it did not make the motion of the chain impossible. It will thus be appreciated that I have produced an efficient and simple arrangement for controlling the action of sprocket chains when it be desired to utilize the same to produce a thrust action as well as a pulling action.

Having thus described this form of my invention what I desire to claim and protect by Letters Patent is:

1. In combination with a device to be operated by a sprocket chain, a sprocket wheel adapted to be operated by suitable means, a sprocket chain having block links and side plates and adapted to be connected with the device to be operated, said side plates being in the form of links having abutting end surfaces to prevent bowing inwardly toward the sprocket wheel axis, and a guiding member having an edge located adjacent and following the curved path of the block links around the sprocket wheel and having a continuous straight surface extending beyond the periphery of said sprocket wheel in the direction of the path of the chain and positioned to engage the outer side of the adjacent block links of the chain and prevent the outward bowing of the chain when the links are in alignment.

2. In combination with a device to be operated by a sprocket chain having central block links, and external side links provided with abutting end surfaces, a sprocket wheel adapted to engage said block links, a guiding plate having an edge located adjacent and following the curved path of the block links around the sprocket wheel and provided with a continuous straight surface extending beyond the periphery of said sprocket wheel in the direction of said device and positioned to engage the outer side of the adjacent block links of the chain, means for rotating said sprocket wheel to move said device into various positions, and a rotatable member upon which the inactive end of said chain is wound spirally.

3. In combination with a window to be raised and lowered, a sprocket chain attached thereto and having central block links, and external side links provided with abutting end surfaces, a sprocket wheel adapted to engage said block links, means for rotating said sprocket wheel to move said window, a guiding plate having an edge located adjacent and following the curved path of the block links around the sprocket wheel and provided with a continuous straight edge extending beyond the periphery of said sprocket wheel in the direction of said device and positioned to engage the outer side of the adjacent block links of the chain, and a counterbalancing drum upon which the inactive end of said chain is wound spirally.

Signed at New York this 19th day of May, 1925.

HARRY P. STEVENS.